(12) United States Patent
Bryger et al.

(10) Patent No.: US 9,575,544 B2
(45) Date of Patent: Feb. 21, 2017

(54) ULTRASOUND BASED MOBILE RECEIVERS IN IDLE MODE

(75) Inventors: Boaz E. Bryger, Zikhron Yaaqov (IL);
Baruch Eruchimovitch, Haifa (IL);
Noam Dagan, Binyamina (IL)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 13/290,797

(22) Filed: Nov. 7, 2011

(65) Prior Publication Data
US 2013/0114380 A1    May 9, 2013

(51) Int. Cl.
*G06F 1/32* (2006.01)
*G06F 3/01* (2006.01)

(52) U.S. Cl.
CPC ............. *G06F 1/325* (2013.01); *G06F 3/017* (2013.01)

(58) Field of Classification Search
CPC ........ G06F 1/3203; G06F 1/324; G06F 1/325; G06F 3/017; G06F 1/3287; G06F 1/3293; G06F 3/03545; G06F 1/3262; G06F 1/3265
USPC ............. 340/6.13, 7.32, 7.33; 367/197, 199; 345/173
See application file for complete search history.

(56) References Cited

U.S. PATENT DOCUMENTS

| | | | | |
|---|---|---|---|---|
| 4,322,974 A | * | 4/1982 | Abele | G01S 7/52036 73/602 |
| 4,628,493 A | * | 12/1986 | Nelson | G01V 1/22 340/870.13 |
| 5,977,957 A | | 11/1999 | Miller et al. | |
| 6,577,299 B1 | | 6/2003 | Schiller et al. | |
| 7,279,646 B2 | | 10/2007 | Xu | |
| 8,248,389 B2 | | 8/2012 | Raif et al. | |
| 2005/0150697 A1 | | 7/2005 | Altman et al. | |
| 2009/0184849 A1 | | 7/2009 | Nasiri et al. | |
| 2010/0031072 A1 | * | 2/2010 | Hung | G06F 1/3203 713/323 |
| 2010/0257392 A1 | | 10/2010 | Ranta | |

(Continued)

FOREIGN PATENT DOCUMENTS

CN     1617058 A     5/2005
CN   102007613 A     4/2011
(Continued)

OTHER PUBLICATIONS

International Search Report and Written Opinion—PCT/US2012/062598—ISA/EPO—Jul. 19, 2013.

(Continued)

*Primary Examiner* — An T Nguyen
(74) *Attorney, Agent, or Firm* — Silicon Valley Patent Group LLP

(57) ABSTRACT

An acoustic system, which may be ultrasonic, operates in a power efficient idle mode thereby reducing the power consumption required by high frequency sampling and processing. While in idle mode, an acoustic receiver device operates with an idle sampling rate that is lower than the full sampling rate used during full operational mode, but is capable of receiving a wake-up signal from the associated acoustic transmitter. When the wake-up signal is received, the acoustic receiver switches to full operational mode by increasing the sampling rate and enables full processing. The acoustic system may be used in, e.g., an ultrasonic pointing device, location beacons, in peer-to-peer communications between devices, as well as gesture detection.

24 Claims, 4 Drawing Sheets

(56) References Cited

U.S. PATENT DOCUMENTS

| | | | | |
|---|---|---|---|---|
| 2011/0029247 A1* | 2/2011 | Kalathil | ............... | A61B 5/1455 |
| | | | | 702/19 |
| 2011/0080349 A1* | 4/2011 | Holbein et al. | ............... | 345/173 |
| 2012/0191993 A1* | 7/2012 | Drader | .................. | G06F 1/3215 |
| | | | | 713/320 |
| 2012/0331546 A1* | 12/2012 | Falkenburg | ......... | G06F 3/03545 |
| | | | | 726/16 |

FOREIGN PATENT DOCUMENTS

| | | |
|---|---|---|
| JP | H0566863 A | 3/1993 |
| JP | 2010033531 A | 2/2010 |
| WO | 2006100682 A2 | 9/2006 |

OTHER PUBLICATIONS

Katz D.J., et al., "Basics of Embedded Audio Processing—Chapter 5", Basic lecture for processing embedded media, SHOEISHA Co., Ltd., Nov. 19, 2007, First edition, pp. 138-143.

* cited by examiner

# ULTRASOUND BASED MOBILE RECEIVERS IN IDLE MODE

BACKGROUND

Electronic pointing devices sometimes transmit acoustic signals, and most often ultrasound signals, from which the position of the electronic pointing devices position may be determined. For example, a digital pen or stylus operates as a standard pen permitting the user to write on paper while transmitting pre-defined, encoded, ultrasound data that is received by a receiver and used to determine the position of the digital pen. The ultrasound data is sampled and decoded by the receiver, which may be mobile device, such as a smartphone, notebook, tablet PC, Slate, e-Reader, etc. Based on signal processing algorithms, the mobile device can determine the precise location of the pointing device and thus, the digital pen may serve as a data input apparatus for the mobile device. Ultrasound-based digital pens may be used as touch screen replacement/complement, high resolution graphical input device, navigation mouse, 2D/3D gaming, etc. Ultrasound technology, in general, may also be used to enhance user experience in applications such as hand gesture detection, finger hovering, and peer-to-peer positioning and communications.

The audio digitizers (CODECs) in the mobile devices that are used with ultrasound technology are typically part of the audio sub-system, which traditionally was used to sample and reproduce voice and music—all in the hearing range of frequencies (up to 25 kHz). The CODECs of traditional audio systems use a sampling frequency of up to 48 kHz. Recently, due to the emergence of various ultrasound technologies, CODECs are often designed now to support a higher sampling rate, e.g., up to 200 kHz and more, and thus are capable of sampling the ultrasound data transmitted by an ultrasound-based devices. The sampling rate, however, has a direct relation to power consumption, and thus the use of a higher sampling rate for ultrasound data results in increased power consumption. Moreover, processing of the ultrasound samples also contributes to CPU utilization, and as a result, consumes more power.

SUMMARY

An acoustic system, which may be ultrasonic, operates in a power efficient idle mode thereby reducing the power consumption required by high frequency sampling and processing. While in idle mode, an acoustic receiver device operates with an idle sampling rate that is lower than the full sampling rate used during full operational mode, but is capable of receiving a wake-up signal from the associated acoustic transmitter. When the wake-up signal is received, the acoustic receiver switches to full operational mode by increasing the sampling rate and enable full processing. The acoustic system may be used in, e.g., an ultrasonic pointing device, location beacons, in peer-to-peer communications between devices, as well as gesture detection.

In one implementation, a method includes operating an acoustic receiver device in an idle mode using an idle sampling rate that is less than the full sampling rate; receiving a wake-up signal from an acoustic transmitter device, the wake-up signal having a frequency that is detectable by the acoustic receiver device while in the idle mode; and operating the acoustic receiver device in the full sampling rate in response to the wake-up signal.

In another implementation, an apparatus includes an acoustic receiver for receiving acoustic signals from an acoustic transmitter; and a processor connected to the acoustic receiver, the processor being configured to cause the acoustic receiver to operate in an idle mode using an idle sampling rate that is less than the full sampling rate, detect a wake-up signal received by the acoustic receiver while in idle mode, and to cause the acoustic receiver device to operate in the full sampling rate in response to the wake-up signal.

In another implementation, an apparatus includes means for operating an acoustic receiver device in an idle mode using an idle sampling rate that is less than the full sampling rate; means for receiving a wake-up signal from an acoustic transmitter device, the wake-up signal having a frequency that is detectable by the acoustic receiver device while in the idle mode; and means for operating the acoustic receiver device in the full sampling rate in response to the wake-up signal.

In yet another implementation, a non-transitory computer-readable medium including program code stored thereon, includes program code to operate an acoustic receiver device in an idle mode using an idle sampling rate that is less than the full sampling rate; program code to detect a wake-up signal from an acoustic transmitter device, the wake-up signal having a frequency that is detectable by the acoustic receiver device while in the idle mode; and program code to operate the acoustic receiver device in the full sampling rate in response to the wake-up signal.

In another implementation, a method includes sending a wake-up signal from an acoustic transmitter device, wherein the wake-up signal has a frequency that is lower than a full range of frequencies transmitted during full operation of the acoustic transmitter device; determining that an acoustic receiver device is in full operational mode in response to the wake-up signal; and transmitting acoustic data in the full range of frequencies.

In another implementation, an apparatus includes an acoustic transmitter; and a processor connected to the acoustic transmitter, the processor being configured to cause the acoustic transmitter to send a wake-up signal with a frequency that is lower than a full range of frequencies transmitted during full operation of the acoustic transmitter, determine that an acoustic receiver is in full operational mode in response to the wake-up signal, and to cause the acoustic transmitter to transmit acoustic data in the full range of frequencies.

In another implementation, an apparatus includes means for sending a wake-up signal from an acoustic transmitter device, wherein the wake-up signal has a frequency that is lower than a full range of frequencies transmitted during full operation of the acoustic transmitter device; means for determining that an acoustic receiver device is in full operational mode in response to the wake-up signal; and means for transmitting acoustic data in the full range of frequencies.

In yet another implementation, a non-transitory computer-readable medium including program code stored thereon includes program code to sending a wake-up signal from an acoustic transmitter device, wherein the wake-up signal has a frequency that is lower than a full range of frequencies transmitted during full operation of the acoustic transmitter device; program code to determine that an acoustic receiver device is in full operational mode in response to the wake-up signal; and program code to transmit acoustic data in the full range of frequencies.

DETAILED DESCRIPTION

Figure 1:
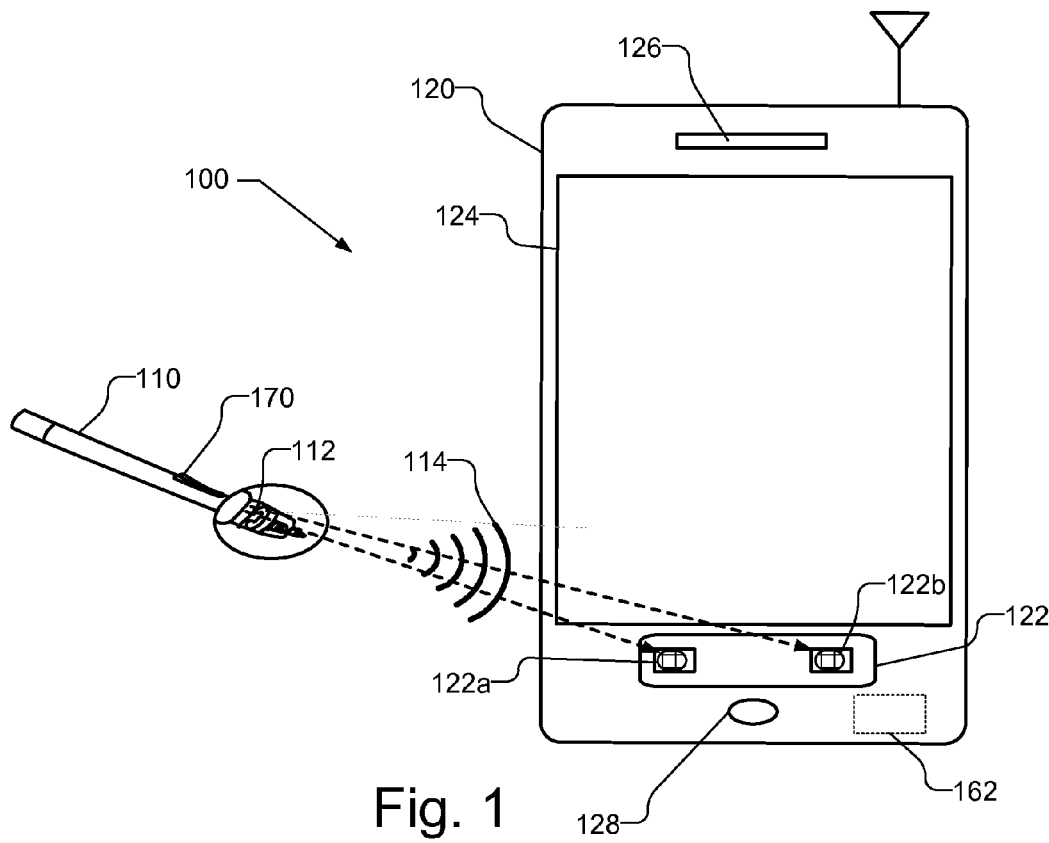
FIG. 1 illustrates an acoustic system, including a transmitter device and receiver device capable of operating in a power efficient idle mode.

FIG. 1 illustrates an acoustic system 100 capable of operating in a power efficient idle mode. The acoustic system 100 operates in the ultrasonic range, and is therefore sometimes referred to as an ultrasonic system 100. However, it should be understood that the present disclosure may be applicable to systems that operated outside of the ultrasound range. The ultrasonic system 100 is illustrated as including a transmitter device 110 with an ultrasonic transmitter 112 that emits acoustic signals 114, and a receiver device 120 that includes an acoustic (ultrasonic) receiver 122 that includes two microphones 122a, 122b that receive the acoustic signals 114. The acoustic receiver 122 may include additional microphones, e.g., more than 3 or 4 microphones, if desired. The receiver device 120 includes a CODEC 162 (or multiple CODECs) for sampling and decoding acoustic signals received by acoustic receiver 122. The transmitter device 110 is illustrated as being in the form of a writing instrument, e.g., a digital pen, but it should be understood that the transmitter device 110 is not limited to a digital pen but may be any desired type of transmitting ultrasonic device including, but not limited to, a pointing device, digital stylus, or mouse (e.g., in a user interface application), location beacons (e.g., in a navigation application) or neighboring devices similar to the receiver device 120 (e.g., in a peer-to-peer communication application).

The receiver device 120 is illustrated as a mobile platform, such as a cellular telephone or smartphone, including a display 124, which may be a touch screen display, as well as a speaker 126 and microphone 128, which is illustrated as being separate from but may be part of the ultrasonic receiver 122. While the receiver device 120 is illustrated as a cellular telephone, it should be understood that receiver device 120 may be any desired electronic device, including a portable computer, such as a laptop, notebook, or tablet type computer, or other similar devices, such as an e-book reader or personal communication system (PCS) device, personal navigation device (PND), Personal Information Manager (PIM), Personal Digital Assistant (PDA), or other suitable devices. While the ultrasound power efficient idle mode provided in ultrasonic system 100 advantageously preserves battery life and is therefore most beneficial in mobile devices with limited battery file, the ultrasonic system 100 may also be used in less portable or stationary devices as well.

During the idle mode, the receiver device 120 does not operate with the high sampling rate required by ultrasonic data transmission and does not process ultrasound samples, but rather supports only a minimal set of features that are used to wake the receiver device 120 from the idle mode. The use of the idle mode to reduce the power requirement of the ultrasonic communication is advantageous with mobile systems that are subjected to extremely low power consumption requirements, such as "always on, always connected" mobile platforms. The receiver device 120 uses a lower sampling rate while in idle mode, but has a sampling rate that is sufficient to ensure that once the user wants to use the ultrasonic system 100, the receiver device 120 wakes from the idle mode within an acceptable time and switches to full operational mode. By way of example, a user may indicate the desire to use the ultrasonic system 100 by activating a user input element 170, illustrated in FIG. 1 as button but, alternatively, may be motion sensors that detect shaking of the transmitter device 110 for a period of time, e.g., 0.5 s, or by any other appropriate mechanism. The user input element 170 causes the transmitter device 110 to transmit a wake-up acoustic signal. In embodiments where the transmitter device 110 is an ultrasound emitting navigation beacon or any similar type of device, the transmitter device 110 may periodically transmit the wake-up acoustic signal to any nearby receiver devices 120. The wake-up acoustic signal may be in the range of hearing frequencies, generally considered to be less than 25 kHz, or possibly in ultrasonic frequencies, generally considered to be above 25 kHz, but is generally lower than the ultrasonic frequencies emitted during full operational mode.

While in idle mode, the receiver device 120 uses a decreased sampling rate, e.g., 48 kHz, which is sufficient to detect the wake-up acoustic signal, but is not sufficient to support the ultrasound data capture required during full operational mode. For example, during idle mode, the receiver device 120 may have a sampling rate that is sufficient to detect acoustic signals in the range of hearing frequencies, but not ultrasonic frequencies. If desired, however, the receiver device 120 may have a sampling rate that is sufficient to capture ultrasonic frequencies (e.g., greater than 25 kHz) while in idle mode, but is less than full ultrasonic spectrum used during full operational mode. In other words, while in idle mode the receiver device 120 may have a sampling rate that permits detection of signals in a range of acoustic frequencies that is completely or partially within the range of ultrasonic frequencies detected while in full operational mode or completely outside the range of ultrasonic frequencies detected while in full operational mode. By way of example, if the receiver device 120 has a sampling rate that is sufficient to detect ultrasonic frequencies of 25-80 kHz while in full operational mode, the receiver device 120 may use a sampling rate that can only detect acoustic frequencies of less than 25 kHz, or 25-30 kHz, or 25-40 kHz, while in idle mode. While 25-30 kHz, or 25-40 kHz are ultrasonic frequencies, this range is less than the full ultrasonic range (25 kHz-80 kHz), and requires less sampling and less processing.

The sampling rate used by the CODEC 162 in the receiver device 120 for acoustic frequencies within the human hearing range, e.g., is 48 kHz. Thus, while in idle mode, the CODEC 162 in the receiver device 120 may have an idle sampling rate of 48 kHz. As discussed above, in idle mode the receiver device 120 may be operational in low ultrasound frequencies, i.e., frequencies greater than human hearing, but that are lower than or a low subset of the range of frequencies used when in full operational mode. Thus, while in idle mode the CODEC 162 in the receiver device 120 may operate at a sampling rate greater than, e.g., 48 kHz, but still less than the full sampling rate. For example, the idle sampling rate may be, e.g., 96 kHz, which is sufficient to support some ultrasonic frequencies, but is less than the full sampling rate of, e.g., 192 kHz, and therefore cannot support the full range of ultrasonic frequencies that are supported in full operational mode. A sampling rate of 96 kHz is lower than 192 kHz and therefore requires less power, while 48 kHz requires even less power.

The wake-up acoustic sequence transmitted by transmitter device 110 is in a range of frequencies that can be detected by the receiver device 120 while in idle mode, e.g., lower than ultrasonic frequencies or low ultrasonic frequencies. Thus, the receiver device 120 will detect the request from the transmitter device 110 to switch from idle mode to full operation mode. When in the full operational mode, the receiver device 120 will increase the sampling rate to the full sampling rate which supports the ultrasound data capture, e.g., 192 kHz. Thus, during the ultrasound idle mode, the receiver device 120 operates in low power, by both reducing the sampling rate and avoiding unnecessary processing.

Figure 2:
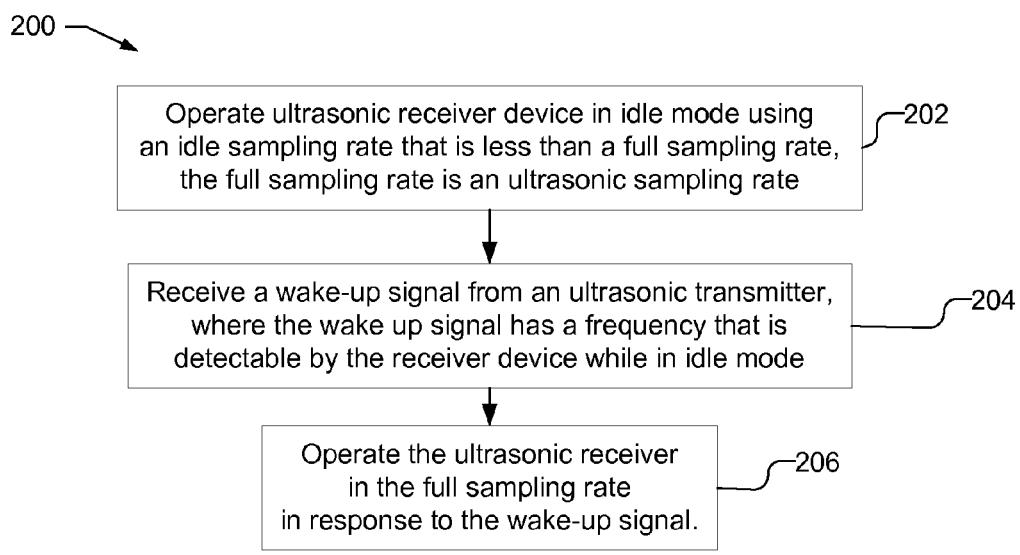
FIG. 2 is a flow chart illustrating the operation of the receiver device in the acoustic system.

FIG. 2 is a flow chart 200 illustrating the operation of the receiver device 120 in the ultrasonic system 100. As illustrated, the receiver device 120 operates in an idle mode using an idle sampling rate that is less than the full sampling rate, where the full sampling rate is an ultrasonic sampling rate (202). The idle sampling rate used by the receiver device 120 may be sufficient to sample acoustic signals with frequencies, e.g., lower than ultrasound frequencies. The idle sampling rate may be high enough to sample ultrasonic acoustic signals, but is still less than the full sampling rate. The receiver device 120 searches in all audio samples for a pre-defined wake-up signal embedded in an expected frequency, e.g., 22 kHz-24 kHz. If desired, the CODEC 162 may be placed in a limited active state, so the CODEC 162 need not remain active all the time. For example, while in a limited active state, the CODEC 162 may become active periodically for a limited time, e.g., every 1 second, to determine if an acoustic signal having the expected frequency of the wake-up signal, e.g., 22 kHz-24 kHz, and return to an inactive state if none is found. The CODEC 162 may be limited to sampling specific frequencies that are expected in the wake-up signal, while in the limited active state.

As illustrated in FIG. 2, the receiver device 120 receives a wake-up signal from an ultrasonic transmitter device, where the wake up signal has a frequency that is detectable by the receiver device while in idle mode (204). The receiver device 120 then switches to operate in the full sampling rate in response to the wake-up signal (206). The full sampling rate may be, e.g., 192 kHz. Upon moving to fully operational mode, the user of the ultrasonic system 100 may receive auditory or visual feedback (e.g., via speaker 126 or display 124 in FIG. 1) that the ultrasonic system 100 is ready to use. If desired, the receiver device 120 may provide a signal, e.g., an infrared (IR) or radio frequency (RF) signal, to the transmitter device 110 that the receiver device 120 is now in full sampling mode and ready for use. The receiver device 120 may return to idle mode upon predetermined conditions, such as when no ultrasonic data is received for a specified period of time or in response to user input.

Figure 3:
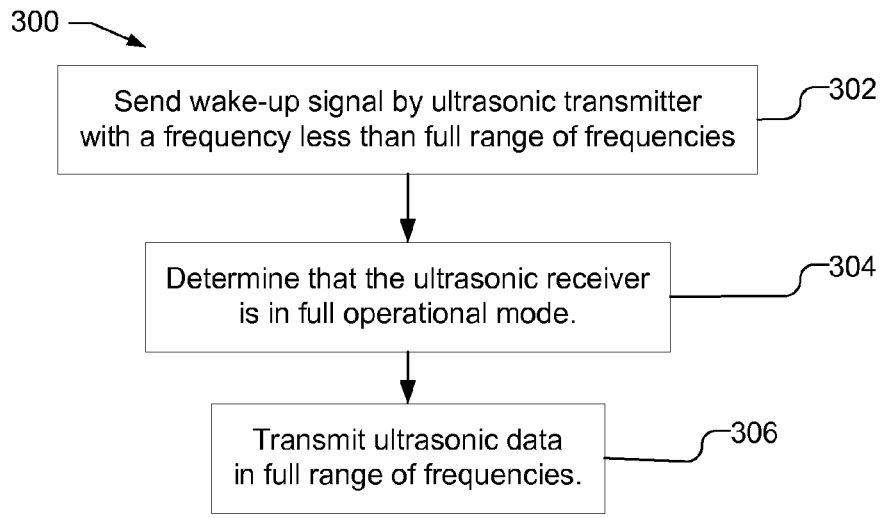
FIG. 3 is a flow chart illustrating the operation of a transmitter device in the acoustic system

FIG. 3 is a flow chart 300 illustrating the operation of a transmitter device 110 in the ultrasonic system 100. The transmitter device sends a wake-up signal that has a frequency that is lower than a full range of frequencies used during full operation of the transmitter device (302). For example, the wake-up signal may have frequency of less than 25 kHz, or between 25-30 kHz, or 30-40 kHz, whereas the frequencies used during full operation may be 25-80 kHz. The transmission of the wake-up signal may be in response to a user input, such as pressing a button on the transmitter device or movement of the transmitter device, such as shaking for a period of time or tapping designated sequence. In the case of ultrasound emitting beacons, a wake-up signal is periodically transmitted to any nearby mobile devices without user input. The wake-up signal is a pre-defined signal, which may be unique for each ultrasound based device. The wake-up signal may be at the highest possible frequencies below the Nyquist rate, so that it does not interfere with or generates minimal interference to the user, i.e., the signal cannot be heard. By way of example, the wake-up signal may be a pre-defined signal ranging from 22 kHz to 24 kHz, at low power. However, any low power signal can be used with frequencies that are sufficiently low to be detected by the idle sampling rate, e.g., 48 kHz. The transmitter device 110 determines that the receiver device 120 is in full operational mode (304). For example, the transmitter device 110 may receive a signal, e.g., an IR or RF signal, from the receiver device 120 indicating that the receiver device 120 is in full operational mode in response to the wake-up signal. Alternatively, the transmitter device 110 may receive no signals from the receiver device 120, and may unilaterally determine that the receiver device 120 is in full operational mode after a predetermined delay from sending the wake-up signal. The ultrasonic transmitter then transmits ultrasonic data in the full range of frequencies (306).

If desired, the wake-up signal may not be transmitted at a pre-defined signal range, and instead, the receiver device 120 uses an under-sampling method to detect the wake-up signal. For example, the receiver device 120 may be in idle mode in which the idle sampling rate is lower than the full sampling rate. If the transmitter device 110 produces an acoustic signal that exceeds the Nyquist rate, e.g., the transmitted acoustic signal is above 24 kHz while the idle sampling rate is 48 kHz, aliasing effects are produced within the receiver device 120. Thus, the presence of aliasing artifacts in audio data sampled by the receiver device 120 may be used as an indication that the receiver device 120 should exit the idle mode. If desired, the transmitted wake-up signal may be specifically configured so that the aliasing artifacts can be decoded by the receiver device 120 to provide a reliable indication to exit the idle mode. While an analog filter is typically present before the sampler to reject aliasing in the sampled signal, the analog filter may be configured to permit aliasing effects while the receiver device 120 is in idle mode.

Figure 4:
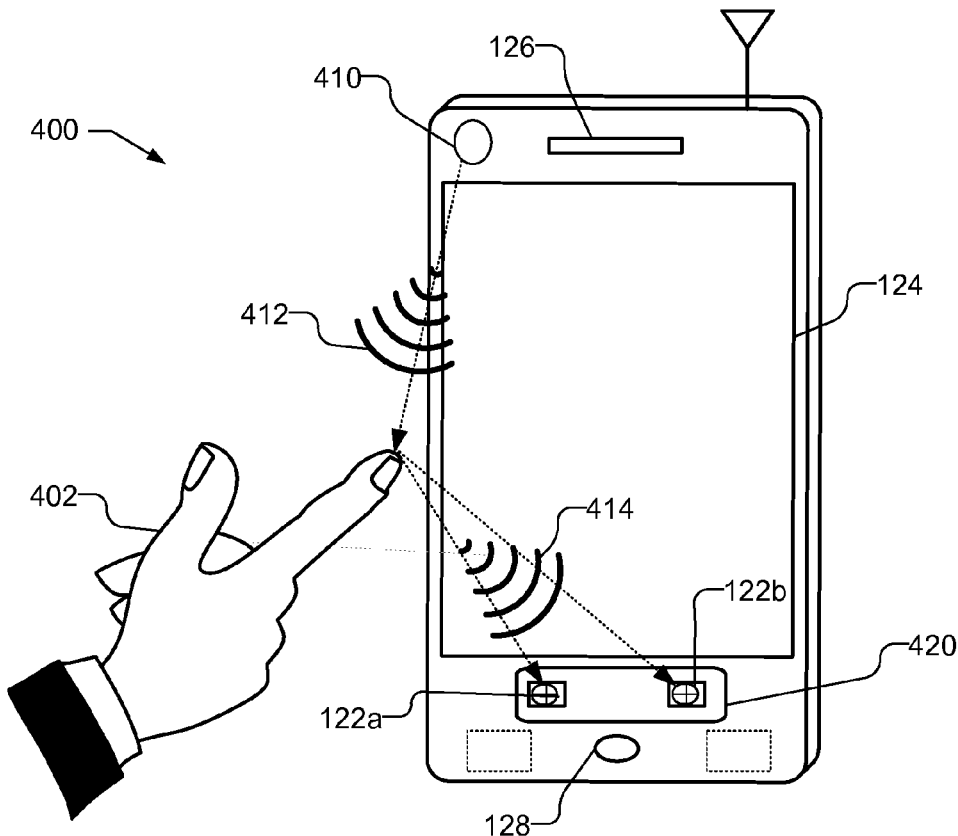
FIG. 4 illustrates an acoustic system, similar to that shown in FIG. 1, but with the transmitter device and receiver device co-located.

Additionally, while FIG. 1 illustrates an ultrasonic system 100 with a separate transmitter device 110 and receiver device 120, if desired, the principles described herein may be extended to an ultrasonic system 400 with the transmitter device 410 and receiver device 420 co-located, which may be used for, e.g., gesture recognition, as illustrated in FIG. 4. The ultrasonic system 400 is similar to the ultrasonic system 100 described in FIG. 1, except that the transmitter device 410 and receiver device 420 are co-located, like designated elements being the same. As illustrated, the transmitter device 410 produces an ultrasonic signal 412 that is reflected off of an object 402, illustrated as a hand in FIG. 4, in front of the ultrasonic system 100. The reflected signal 414 is returned to the receiver device 420. As the object 402 moves, the position of the object may be determined based on the reflected signal, and thus, gestures may be detected. The use of the full ultrasonic spectrum is beneficial to the performance of the ultrasonic system 400 to detect gestures, but is unnecessary to detect only the presence of an object, i.e., proximity detection. Thus, while in idle mode, the ultrasonic system 400 may transmit acoustic signals either with high or low bandwidth, while the receiver device 420 uses an idle sampling rate, which is lower than the full sampling rate, but is sufficient to detect when there is an object in front of the device. When an object is detected, the ultrasonic system 400 switches from idle mode to full sampling mode so that gestures may be detected.

Figure 5:
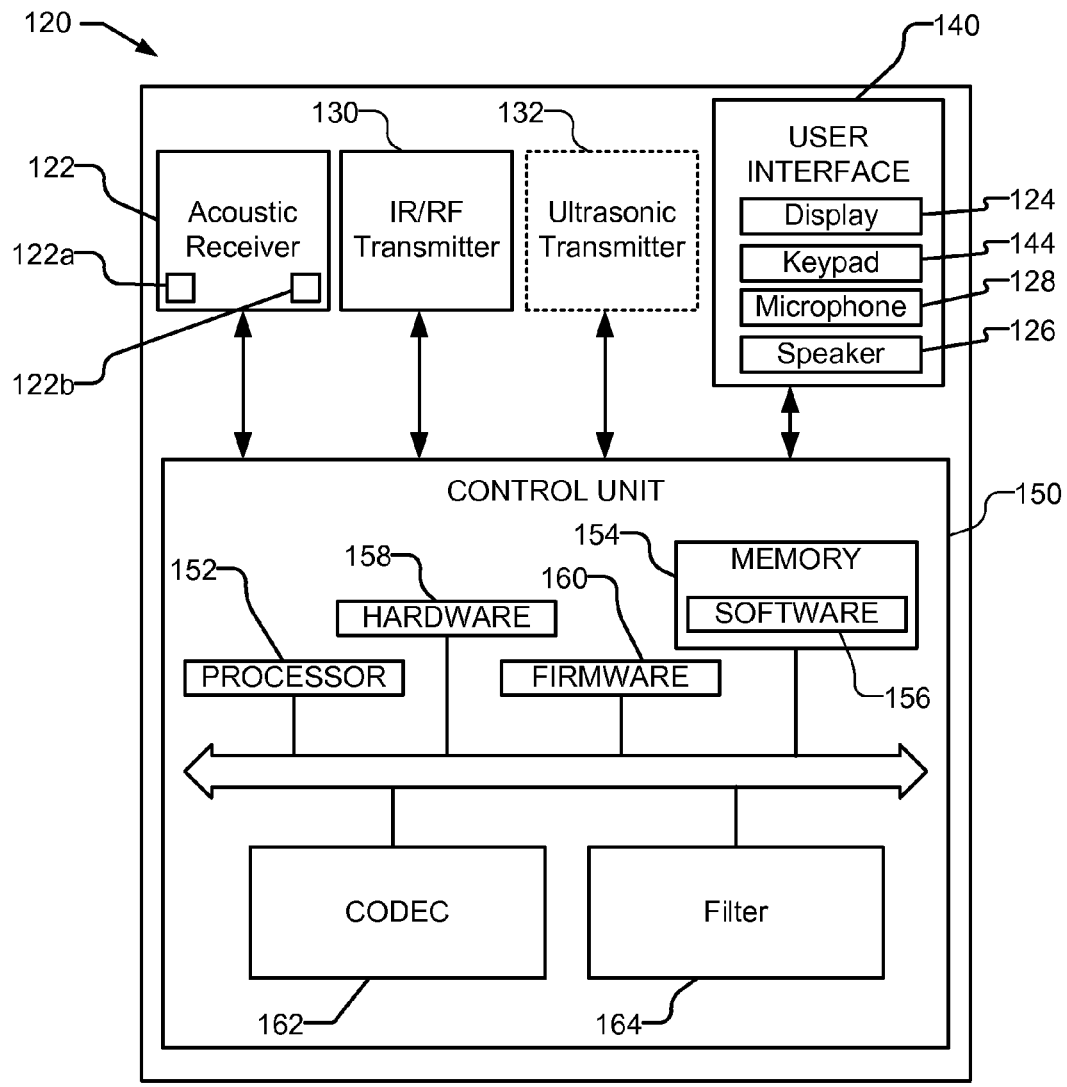
FIG. 5 is a block diagram of the receiver device that may be used with the ultrasonic system.

FIG. 5 is a block diagram of the receiver device 120 that may be used with the ultrasonic system 100, shown in FIG. 1. The receiver device 120 includes the acoustic receiver 122, which may include two or more microphones 122*a*, 122*b* capable of receiving acoustic, e.g., ultrasonic, signals, from the transmitter device 110 (shown in FIG. 1). The receiver device 120 may also include a transmitter 130, which is used to transmit, e.g., an IR or RF signal to the transmitter device 110 when the receiver device 120 has switched from idle mode to full operating mode. Additionally, an ultrasonic transmitter 132 may be present, i.e., co-located with the acoustic receiver 122, which may be useful for peer-to-peer communications, or for gesture detection, as discussed in reference to FIG. 4. The receiver device 120 may also include a user interface 140 that includes the display 124 capable of displaying text or images. The user interface 140 may also include a keypad 144 or other input device through which the user can input information into the receiver device 120. If desired, the keypad 144 may be obviated by integrating a virtual keypad into the display 124 with a touch sensor. The user interface 140 may also include a microphone 128 and speaker 126, e.g., if the mobile platform is a cellular telephone. If desired, the microphone 128 may be part of the acoustic receiver 122. Of course, receiver device 120 may include other elements unrelated to the present disclosure.

The receiver device 120 also includes a control unit 150 that is connected to and communicates with the acoustic receiver 122, the transmitter 130, and ultrasonic transmitter 132 (if present), as well as the user interface 140, along with any other desired features. The control unit 150 may be provided by a processor 152 and associated memory/storage 154, which may include software 156, as well as hardware 158, and firmware 160. The control unit 150 includes a CODEC 162, which is used to decode the acoustic signal received by acoustic receiver 122. The CODEC 162 may be controlled to operate at the full sampling rate or the lower idle sampling rate. If desired, more than one CODEC may be used, e.g., with different CODEC operating at different sampling rates. Control unit 150 is also illustrated with a filter 164, which is used to reject aliasing in the sampled acoustic signal, but which may be controlled to permit aliasing effects while the receiver device 120 is in idle mode. The CODEC 162 is illustrated separate from processor 152 for clarity, but may be implemented in the processor 152 based on instructions in the software 156 which is run in the processor 152. The filter 164 may be an analog filter, such as a high pass filter, but may also be implemented in processor 152 as well. The control unit 150 may be configured to implement one or more functions illustrated or discussed above.

It will be understood as used herein that the processor 152, as well as the CODEC 162 can, but need not necessarily include, one or more microprocessors, embedded processors, controllers, application specific integrated circuits (ASICs), digital signal processors (DSPs), and the like. The term processor is intended to describe the functions implemented by the system rather than limiting these elements to specific hardware. Moreover, as used herein the terms "memory" and "storage" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 158, firmware 160, software 156, or any combination thereof. For a hardware implementation, the CODEC 162 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The receiver device 120 includes a means for operating an acoustic receiver device in an idle mode using an idle sampling rate that less than a full sampling rate, which includes, e.g., the CODEC 162 and processor 152. The receiver device 120 includes a means for receiving a wake-up signal from an acoustic transmitter device, the wake-up signal having a frequency that is detectable by the acoustic receiver device while in the idle mode, which includes the acoustic receiver 122, as well as the processor 152. The receiver device 120 further includes a means for operating the acoustic receiver device in the full sampling rate in response to the wake-up signal, which includes, e.g., the CODEC 162 and processor 152. The receiver device 120 may further include means for decoding the aliasing artifacts when the frequency of the wake-up signal exceeds a Nyquist rate for the acoustic receiver, which may include, e.g., the CODEC 162 and processor 152.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within or external to the processor 152.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
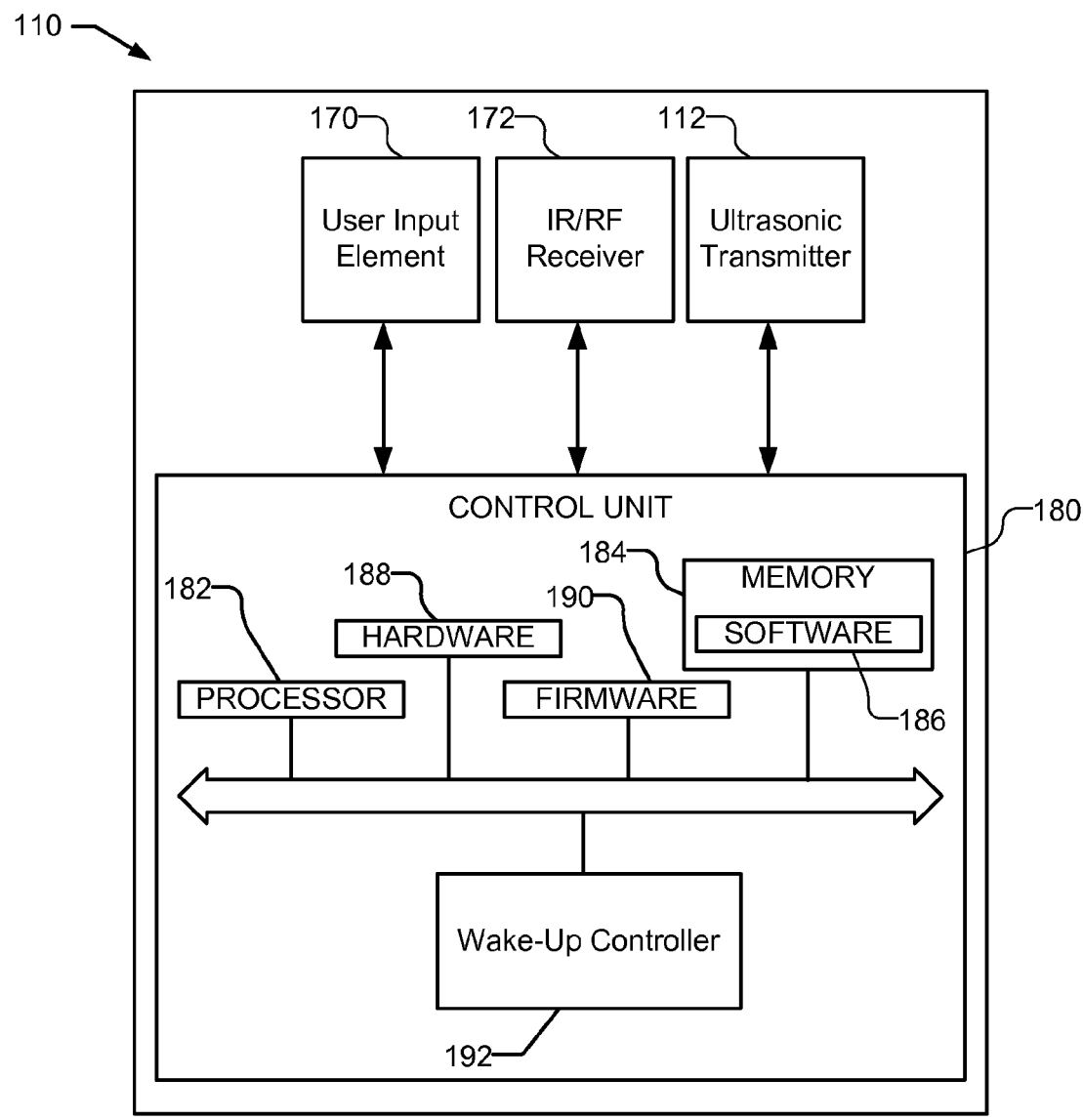
FIG. 6 is a block diagram of the transmitter device that may be used with the ultrasonic system.

FIG. 6 is a block diagram of the transmitter device 110 that may be used with the ultrasonic system 100, shown in FIG. 1. The transmitter device 110 includes an ultrasonic transmitter 112 that transmits ultrasonic signals (and if desired, lower than ultrasonic signals) to the receiver device 120. The transmitter device 110 may also include a user input element, which may be, e.g., motion sensors such one or more accelerometers, or e.g., a mechanical element, such a button or switch. The transmitter device 110 may further include a receiver 172, e.g., an IR or RF receiver, for receiving signals from the receiver device 120 indicating that the receiver device 120 has switched from idle mode to full operating mode. Of course, transmitter device 110 may include other elements depending on the type of device it is and unrelated to the present disclosure.

The transmitter device 110 also includes a control unit 180 that is connected to and communicates with the ultrasonic transmitter 112, the user input element 170, and receiver 172. The control unit 180 may be provided by a processor 182 and associated memory/storage 184, which may include software 186, as well as hardware 188, and firmware 190. The control unit 180 includes a wake-up controller 192, which is used to determine when the user has indicated the desire to use the ultrasonic system 100, e.g., via the user input element 170. The wake-up controller 192 controls the ultrasonic transmitter 112 to transmit a wake-up signals as discussed above. The wake-up controller 192 is illustrated separate from processor 182 for clarity, but may be implemented in the processor 182 based on instructions in the software 186 which is run in the processor 182. The control unit 180 may be configured to implement one or more functions illustrated or discussed above.

It will be understood as used herein that the processor 182, as well as the wake-up controller 192 can, but need not necessarily include, one or more microprocessors, embedded processors, controllers, application specific integrated circuits (ASICs), digital signal processors (DSPs), and the like. The term processor is intended to describe the functions implemented by the system rather than limiting these elements to specific hardware. Moreover, as used herein the terms "memory" and "storage" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 188, firmware 190, software 186, or any combination thereof. For a hardware implementation, the wake-up controller 192 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The transmitter device 110 includes means for sending a wake-up signal from an acoustic transmitter device, wherein the wake-up signal has a frequency that is lower than a full range of frequencies transmitted during full operation of the acoustic transmitter device, which may be, e.g., the ultrasonic transmitter 112. The transmitter device 110 may further include means for determining that an acoustic receiver device is in full operational mode in response to the wake-up signal, which may include the processor 182, as well as the receiver 172. The transmitter device 110 may further include means for transmitting acoustic data in the full range of frequencies, which may be, e.g., the ultrasonic transmitter 112.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 184 and executed by the processor 182. Memory may be implemented within or external to the processor 182.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
operating an acoustic receiver device in an idle mode using an idle sampling rate for acoustic signals that is less than a full sampling rate, wherein the acoustic receiver device is a mobile platform;
receiving a wake-up signal from an acoustic transmitter device, the wake-up signal being an acoustic signal that is acoustically transmitted by the acoustic transmitter device and having a frequency that is detectable by the acoustic receiver device while in the idle mode, wherein the acoustic transmitter device is separate from the mobile platform; and
operating the acoustic receiver device in a full operational mode including the full sampling rate for acoustic signals in response to the wake-up signal.

2. The method of claim 1, wherein the acoustic receiver device is an ultrasonic receiver device and the full sampling rate is an ultrasonic sampling rate, and wherein the acoustic transmitter device is an ultrasonic transmitter device.

3. The method of claim 1, wherein the wake-up signal is below an ultrasonic frequency range and the full sampling rate is an ultrasonic sampling rate.

4. The method of claim 2, wherein the wake-up signal is in an ultrasonic frequency range.

5. The method of claim 1, wherein the frequency of the wake-up signal is below a Nyquist rate for the acoustic receiver device.

6. The method of claim 1, wherein the frequency of the wake-up signal exceeds a Nyquist rate for the acoustic receiver device and produces aliasing artifacts at the acoustic receiver device, the method further comprising decoding the aliasing artifacts.

7. The method of claim 1, wherein the idle sampling rate is 48 kHz.

8. The method of claim 1, wherein the acoustic transmitter device is one of a digital pen, pointing device, digital stylus, mouse, location beacon, and a remote mobile platform.

9. The method of claim 1, further comprising returning the acoustic receiver device to the idle mode.

10. A mobile platform comprising:
an acoustic receiver for receiving acoustic signals transmitted an acoustic transmitter that is separate from the mobile platform; and
a processor connected to the acoustic receiver, the processor being configured to cause the acoustic receiver to operate in an idle mode using an idle sampling rate for acoustic signals that is less than a full sampling rate, detect a wake-up signal that is an acoustic signal transmitted by the acoustic transmitter and received by the acoustic receiver while in the idle mode, and to cause the acoustic receiver to operate in a full operational mode including the full sampling rate for acoustic signals in response to the wake-up signal.

11. The mobile platform of claim 10, wherein the acoustic receiver is an ultrasonic receiver device and the full sampling rate is an ultrasonic sampling rate.

12. The mobile platform of claim 10, wherein the wake-up signal is below an ultrasonic frequency range and the full sampling rate is an ultrasonic sampling rate.

13. The mobile platform of claim 11, wherein the wake-up signal is in an ultrasonic frequency range.

14. The mobile platform of claim 10, wherein the wake-up signal has a frequency that is below a Nyquist rate for the acoustic receiver.

15. The mobile platform of claim 10, wherein the wake-up signal has a frequency that exceeds a Nyquist rate for the acoustic receiver and produces aliasing artifacts at the acoustic receiver, the processor is further configured to decode the aliasing artifacts.

16. The mobile platform of claim 10, wherein the idle sampling rate is 48 kHz.

17. The mobile platform of claim 10, wherein the acoustic transmitter is one of a digital pen, pointing device, digital stylus, mouse, location beacon, and a remote mobile platform.

18. The mobile platform of claim 10, wherein the processor is further configured to cause the acoustic receiver to return to the idle mode.

19. A mobile platform comprising:
means for operating an acoustic receiver device in an idle mode using an idle sampling rate for acoustic signals that is less than a full sampling rate;
means for receiving a wake-up signal from an acoustic transmitter device, the wake-up signal being an acoustic signal that is acoustically transmitted by the acoustic transmitter device and having a frequency that is detectable by the acoustic receiver device while in the idle mode wherein the acoustic transmitter device is separate from the mobile platform; and
means for operating the acoustic receiver device in in a full operational mode including the full sampling rate for acoustic signals in response to the wake-up signal.

20. The mobile platform of claim 19, wherein the acoustic receiver device is an ultrasonic receiver device and the full sampling rate is an ultrasonic sampling rate, and wherein the acoustic transmitter device is an ultrasonic transmitter device.

21. The mobile platform of claim 19, wherein the frequency of the wake-up signal is below a Nyquist rate for the acoustic receiver device.

22. The mobile platform of claim 19, wherein the frequency of the wake-up signal exceeds a Nyquist rate for the acoustic receiver device and produces aliasing artifacts at the acoustic receiver device, the apparatus further comprising means for decoding the aliasing artifacts.

23. A non-transitory computer-readable medium including program code stored thereon, comprising:
program code to operate an acoustic receiver device in an idle mode using an idle sampling rate for acoustic signals that is less than a full sampling rate, wherein the acoustic receiver device is a mobile platform;
program code to detect a wake-up signal from an acoustic transmitter device, the wake-up signal being an acoustic signal that is acoustically transmitted by the acoustic transmitter device and having a frequency that is detectable by the acoustic receiver device while in the idle mode, wherein the acoustic transmitter device is separate from the mobile platform; and
program code to operate the acoustic receiver device in a full operational mode including the full sampling rate for acoustic signals in response to the wake-up signal.

24. The non-transitory computer-readable medium of claim 23, wherein the acoustic receiver device is an ultrasonic receiver device and the full sampling rate is an ultrasonic sampling rate, and wherein the acoustic transmitter device is an ultrasonic transmitter device.

* * * * *